(12) United States Patent
Wong et al.

(10) Patent No.: US 10,187,636 B2
(45) Date of Patent: Jan. 22, 2019

(54) ACTIVE LENS ALIGNMENT SYSTEM

(71) Applicant: ASM Technology Singapore Pte Ltd, Singapore (SG)

(72) Inventors: Chi Shing Wong, Kwai Chung (HK); Fan Leuk Lai, Hong Kong (HK); Po Lam Au, Ma On Shan (HK); Jiangwen Deng, Kwai Chung (HK); Wing Hong Leung, Kwai Chung (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 255 days.

(21) Appl. No.: 14/991,458

(22) Filed: Jan. 8, 2016

(65) Prior Publication Data

US 2017/0201744 A1    Jul. 13, 2017

(51) Int. Cl.

| | |
|---|---|
| H04N 17/00 | (2006.01) |
| H04N 5/225 | (2006.01) |
| H04N 5/232 | (2006.01) |
| H04N 5/235 | (2006.01) |
| G02B 7/00 | (2006.01) |
| G06T 7/80 | (2017.01) |

(52) U.S. Cl.
CPC ........... *H04N 17/002* (2013.01); *G02B 7/005* (2013.01); *G06T 7/80* (2017.01); *H04N 5/2253* (2013.01); *H04N 5/2257* (2013.01); *H04N 5/232* (2013.01); *H04N 5/2354* (2013.01); *H04N 5/23212* (2013.01); *G06T 2207/30204* (2013.01)

(58) Field of Classification Search
CPC .............................. H04N 5/2253; G06T 7/001
See application file for complete search history.

(56) References Cited

U.S. PATENT DOCUMENTS

| | | | | |
|---|---|---|---|---|
| 2004/0252195 A1* | 12/2004 | Lu | ............................. | G02B 7/02 348/188 |
| 2015/0097968 A1* | 4/2015 | Bergman | ............. | H04N 17/002 348/175 |
| 2016/0104285 A1* | 4/2016 | Pettegrew | ................. | G06T 7/80 348/36 |
| 2016/0214546 A1* | 7/2016 | Eytan | ................... | H04N 5/2253 |

* cited by examiner

*Primary Examiner* — William C Vaughn, Jr.
*Assistant Examiner* — Jerry T Jean Baptiste
(74) *Attorney, Agent, or Firm* — Ostrolenk Faber LLP

(57) ABSTRACT

For aligning an image sensor relative to a lens module prior to fixing the image sensor to the lens module, an exposure of the image sensor is turned on and the image sensor is moved to different distances relative to the lens module. At certain predetermined distances between the image sensor and the lens module, a calibration pattern is illuminated and two or more pictures of the calibration pattern which is focused through the lens module are captured with the image sensor to produce at least two pictures of the calibration pattern captured at different distances, the at least two pictures being superimposed onto a calibration image. The exposure of the image sensor is then turned off and the pictures of the calibration pattern are analyzed for determining an alignment between the lens module and the image sensor.

16 Claims, 5 Drawing Sheets

Open state

Closed state

SECTION A-A

ACTIVE LENS ALIGNMENT SYSTEM

FIELD OF THE INVENTION

The invention relates to the assembly of an imaging module, and in particular to aligning a lens module with respect to an image sensor prior to assembling the imaging module.

BACKGROUND AND PRIOR ART

Imaging modules are commonly used in portable consumer devices such as mobile phones, tablets and notebook computers to provide imaging capabilities. Due to the improvement of technology, higher-quality imaging modules are being used in these mobile devices. Therefore, the alignment between a lens module and an image sensor in such an imaging module becomes very important for achieving better image quality during image capturing.

During the assembly of an imaging module, such as that found in a camera for portable consumer devices, it is necessary to align a focusing lens of the lens module and the image sensor in order to achieve the best image quality. Conventionally, the alignment process requires capturing many images at different relative heights between the lens module and the image sensor so as to obtain enough information to achieve accurate alignment. Sometimes, 20-30 images may have to be captured in order to ensure that alignment is accurate. Due to the need to position the lens module and/or image sensor at various heights to grab images and system settling time resulting from vibrations during start-stop positioning movements, the alignment process may take more than 8 seconds in the absence of a high-end image sensor which can attain fast frame capture rates. This results in low throughput.

It would be beneficial to reduce the number of separate images that need to be captured for alignment of the image sensor to the lens module while still being able to obtain sufficient image information for alignment, so as to speed up the alignment process.

SUMMARY OF THE INVENTION

It is thus an object of the invention to seek to achieve faster bonding of a lens module to an image sensor by increasing the information contained in each image that is captured during an alignment process. It is a related object of the invention to seek to obviate the need to stop the lens module relative to the image sensor multiple times during the alignment process.

According to a first aspect of the invention, there is provided a method for aligning an image sensor relative to a lens module prior to fixing the image sensor to the lens module, the method comprising the steps of: turning on an exposure of the image sensor and moving the image sensor to different distances relative to the lens module; at certain predetermined distances between the image sensor and the lens module, illuminating the calibration pattern and capturing with the image sensor two or more pictures of a calibration pattern which is focused through the lens module to produce at least two pictures of the calibration pattern captured at different distances, the at least two pictures being superimposed onto a calibration image; turning off the exposure of the image sensor; and analyzing the pictures of the calibration pattern that are superimposed onto the calibration image for determining an alignment between the lens module and the image sensor.

According to a second aspect of the invention, there is provided an apparatus for aligning an image sensor relative to a lens module prior to fixing the image sensor to the lens module, the apparatus comprising: a positioning device for moving the image sensor to different distances relative to the lens module; an image capturing device operative to capture two or more pictures of a calibration pattern which is focused through the lens module to produce at least two pictures of the calibration pattern captured at different distances, the at least two pictures being superimposed onto a calibration image; and a processor for analyzing the pictures of the calibration pattern that are superimposed onto the calibration image for determining an alignment between the lens module and the image sensor.

It would be convenient hereinafter to describe the invention in greater detail by reference to the accompanying drawings which illustrate a specific preferred embodiment of the invention. The particularity of the drawings and the related description is not to be understood as superseding the generality of the broad identification of the invention as defined by the claims.

BRIEF DESCRIPTION OF THE DRAWINGS

An example of an alignment system and method in accordance with the invention will now be described with reference to the accompanying drawings, in which:

FIG. 4b is a cross-sectional view of the collimator looking along line A-A of FIG. 4a;

DETAILED DESCRIPTION OF THE PREFERRED EMBODIMENT OF THE INVENTION

Figure 1:
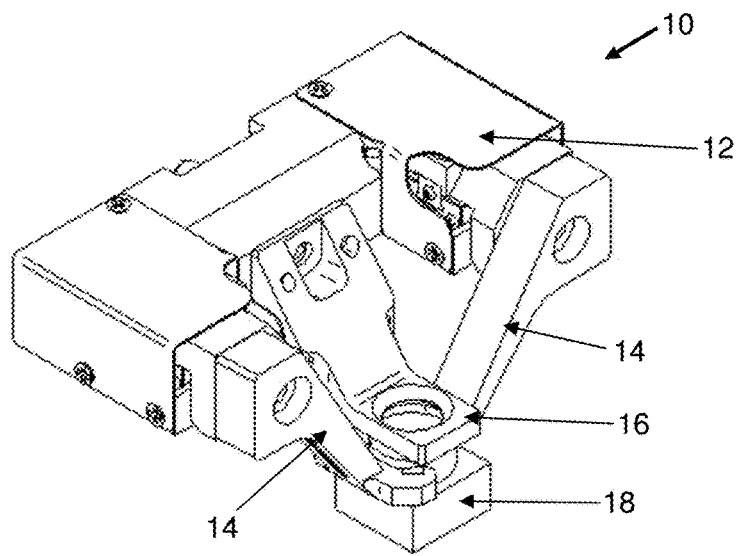
FIG. 1 is an isometric view of an alignment head of a mounting housing according to the preferred embodiment of the invention.

FIG. 1 is an isometric view of an alignment head 10 of a mounting housing for aligning an image sensor relative to a lens module prior to fixing the image sensor to the lens module according to the preferred embodiment of the invention. The alignment head 10 comprises a frame 12 which is affixed on a bond head (not shown). The frame 12 supports a gripper assembly, which may comprise a pair of grippers 14 that are operative to grip a lens module 18 on which a lens is positioned for alignment. The grippers 14 are operative to adjust the lens module 18 to achieve a required alignment prior to fixing the image sensor to the lens module 18.

The frame 12 further supports a stopper 16 which fixes an upper surface of the lens module 18 during an alignment process. The frame 12, together with the bond head, generally has six degrees of freedom and is operative to correct any misalignment of the lens module 18 by positioning and tilting the lens module 18 relative to an image sensor which it is to be aligned to.

Figure 2A:
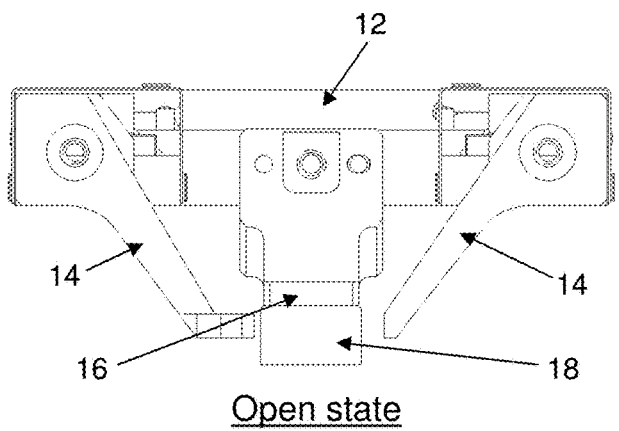
FIGS. 2a and 2b are side views of a gripper assembly of the alignment head in its open and closed states respectively.
Figure 2B:
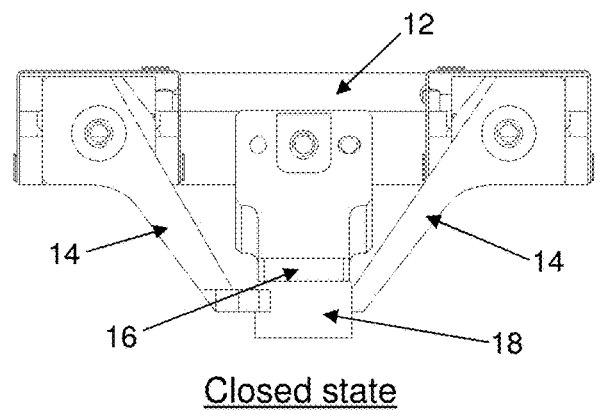

FIGS. 2a and 2b are side views of a gripper assembly of the alignment head in its open and closed states respectively. In FIG. 2a, the frame 12 is moved towards the lens module 18 until the stopper 16 contacts the upper surface of the lens module 18. At this time, the grippers 14 are spaced from the lens module 18.

In FIG. 2b, the grippers 14 are moved until they close onto the lens module 18 to grip it. Thus, the grippers 14 are operative to hold onto the lens module 18 during the alignment process, and may thereafter correct any misalignment that is detected.

Figure 3:
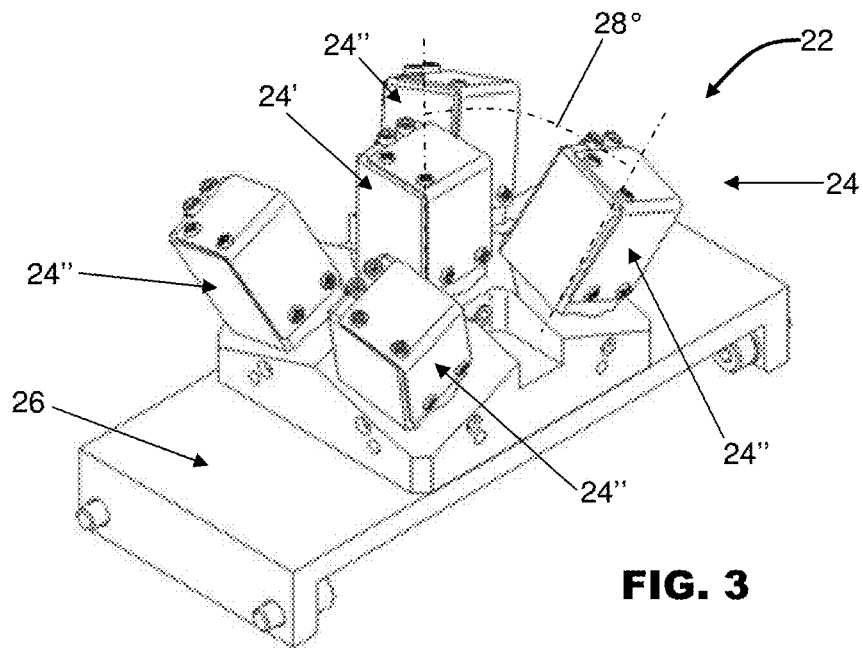
FIG. 3 is an isometric view of a collimator module that is used for achieving alignment between a lens module and an image sensor.

FIG. 3 is an isometric view of a collimator module 22 that is used for achieving alignment between the lens module 18 and an image sensor. The collimator module 22 comprises a plurality of collimators 24 that direct calibration patterns, such as chart patterns, to the image sensor through the lens module 18 for the purpose of alignment. Although there are five collimators 24 illustrated in this embodiment, it should be appreciated that the number of collimators 24 is variable according to design, and may depend on the specific application. The collimators 24 are distributed on a supporting platform 26, preferably equidistant to one another. More preferably, a central collimator 24' is positioned vertically, and a plurality of inclined collimators 24" that surround the central collimator 24' are tilted at an oblique angle (which may be about 28°) with respect to the central collimator 24'.

Figure 4A:
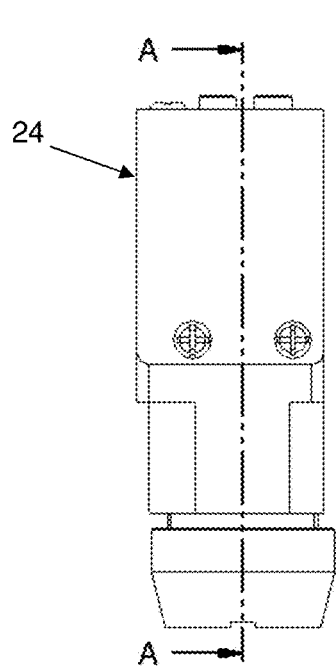
FIG. 4a is a side view of a collimator comprised in the collimator module.
Figure 4B:
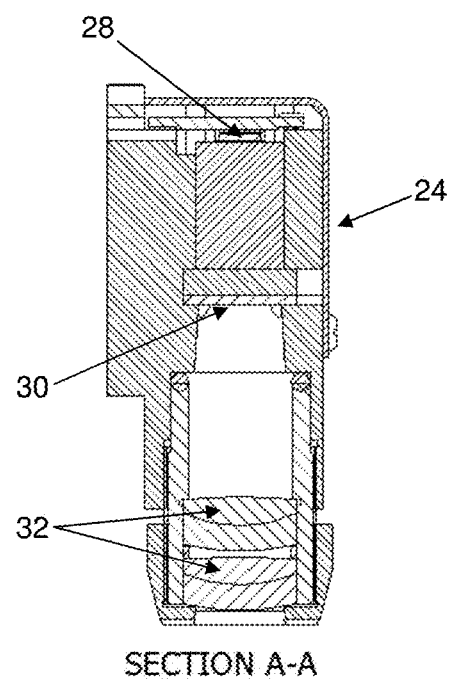

FIG. 4a is a side view of a collimator 24 comprised in the collimator module 22 and FIG. 4b is a cross-sectional view of the collimator 24 looking along line A-A of FIG. 4a. Each collimator 24 comprises a chart pattern 30, an LED light source 28 for illuminating the chart pattern 30, and a lens assembly 32 for directing the illuminated chart pattern 30 towards the image sensor.

The chart pattern 30 contains a small chart including a slanted edge pattern appearing on it. The chart pattern 30 may comprise a variety of designs, and the exact design of the chart may depend on the application. The LED light source 28 supplies backlighting to illuminate the chart pattern 30, whereas a relay lens system forms the lens assembly 32. The backlighting as well as relay lens system in each collimator 24 serve to simulate a virtual object that is focused at a faraway distance, such as at infinity, 20 meters, 10 meters, 5 meters or 2 meters, etc. depending on the application.

Figure 5:
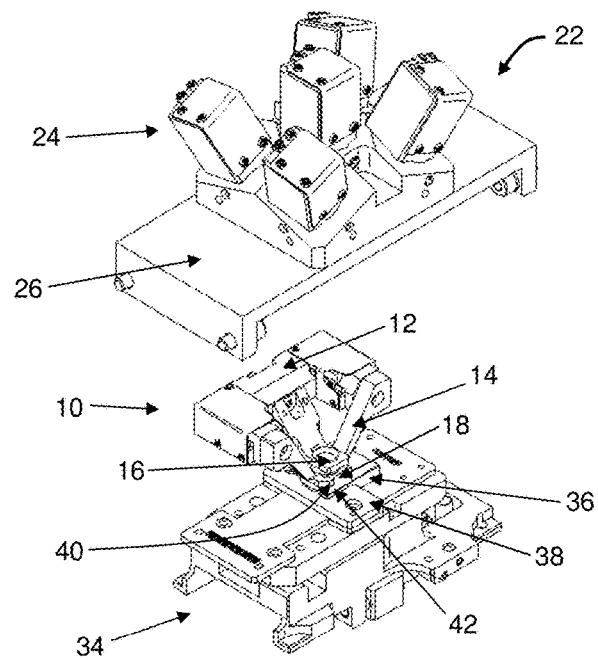
FIG. 5 is an isometric view of an alignment module which comprises the collimator module positioned over the alignment head.

FIG. 5 is an isometric view of an alignment module which comprises the collimator module 22 positioned over the alignment head 10. The lens module 18 that is held by the grippers 14 is positioned such that the collimators 24 direct chart patterns 30 through the lens module 18 onto an image sensor 40 which is mounted on a Device-under-test ("DUT") board beneath the lens module 18. The image sensor 40 is supported on a sensor positioning table 34, which is operative to position the image sensor 40 relative to the lens module 18 and the collimators 24 in the X, Y and Z axes. The image sensor 40 is held on the sensor positioning table 34 by way of a vacuum gripper 42. The sensor positioning table 34 is in turn supported on a positioning table (not shown) for controllably positioning the image sensor 40 on a horizontal plane as well as vertically. For instance, the positioning table may comprise a Z-table that is movably mounted on an X-Y table.

Figure 6:
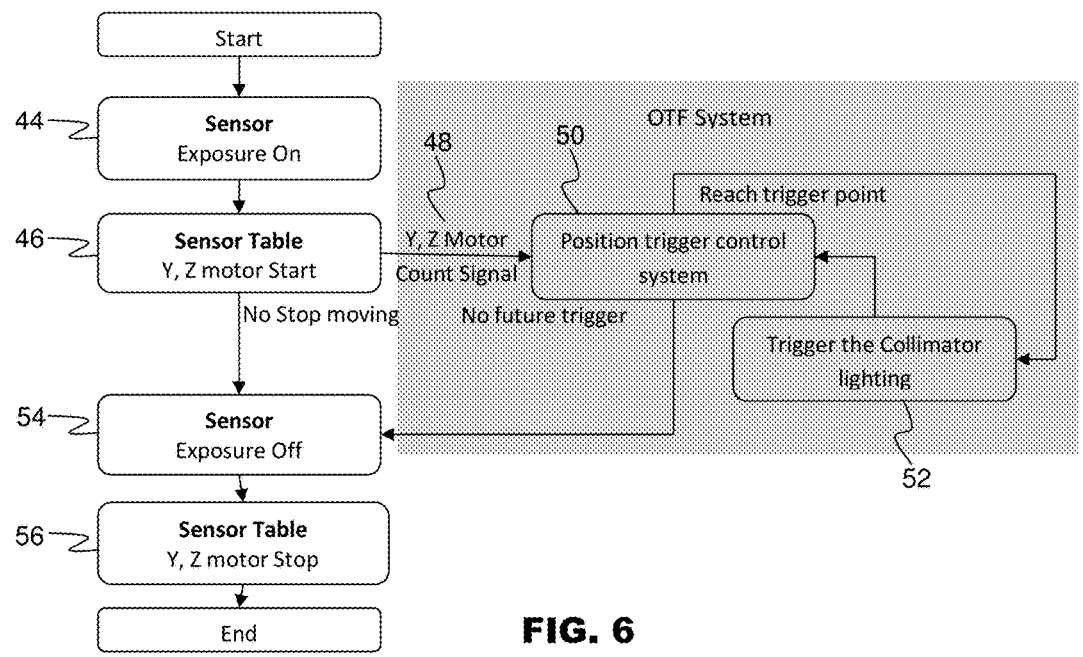
FIG. 6 is a flow chart illustrating the principle of superimposition of pictures for achieving fast active alignment according to the preferred embodiment of the invention.

FIG. 6 is a flow chart illustrating the principle of superimposition of pictures for achieving fast active alignment according to the preferred embodiment of the invention.

At the start of active alignment, the exposure of the image sensor will be turned on 44. Y and Z motors that are coupled to the sensor positioning table 34 will start moving the image sensor 40 in a certain predetermined direction in the Y and Z axes 46 to different heights with respect to the lens module 18. It should be appreciated that the image sensor 40 is therefore simultaneously moved to varying vertical positions as well as varying horizontal positions relative to the lens module 18.

A motor count of the Z motor, which is representative of a current vertical position or height of the image sensor 40, will be counted and monitored 48. An objective of the active alignment step is to obtain focusing information at certain Z motor counts which represent the current height of the image sensor 40. At such Z motor counts where a trigger point is reached, a position trigger control system is activated 50, which in turn triggers the LED light source 28 in the collimator 52 and an picture of the chart pattern 30 is captured by the image sensor 40.

By capturing pictures of the chart pattern 30 at different heights, a Z-level tilt of the lens module is determinable using the height of the image sensor 40 at different positions, so that the Z-level of the image sensor 40 at different points (such as at its central and corner portions) and along its surface will be aligned accurately with respect to the lens module 18.

Illustrations of the aforementioned process in practice are provided below with reference to one preferred embodiment of the invention, wherein five trigger points are predetermined at different heights where the LED light source 28 of the collimator 24 is programmed to flash, for instance at Z=0, 250, 500, 750, 1000 motor counts respectively (each motor count may be equivalent to a relative height change of 0.1 µm). During the actuation of the Y and Z motors, the position trigger control system will be further operative to read the Y and Z motor counts. When the Z motor count reaches a predefined Z trigger level, such as when Z=0, the collimator 24 will flash synchronously for a flash duration of about 15 µs. It should be appreciated that such flash time is variable and it will depend on factors including the image sensor type and gain. Such details may determine the lighting energy that should be emitted from the collimator 24.

After the collimator flash and corresponding picture capturing have been completed, the position trigger control system will read the Y and Z motor counts respectively and then wait for the next predefined Z trigger level (such as Z=250) and so on. After all the five trigger points are reached and all the five collimator's flashes and picture capturing have been completed, the sensor exposure will be turned off 54. The Y and Z motors will also stop moving 56.

Accordingly the whole alignment process is completed with the use of an on-the-fly system which captures readings in real time. In other words, during the process described above with respect to FIG. 6, as the sensor positioning table 34 is moving in the Y and Z directions, the LED light source

28 of the collimator 24 will flash a total of five times at different Y and Z positions, and the result would be multiple Z-level pictures that are captured and superimposed onto a single calibration image.

Figure 7:
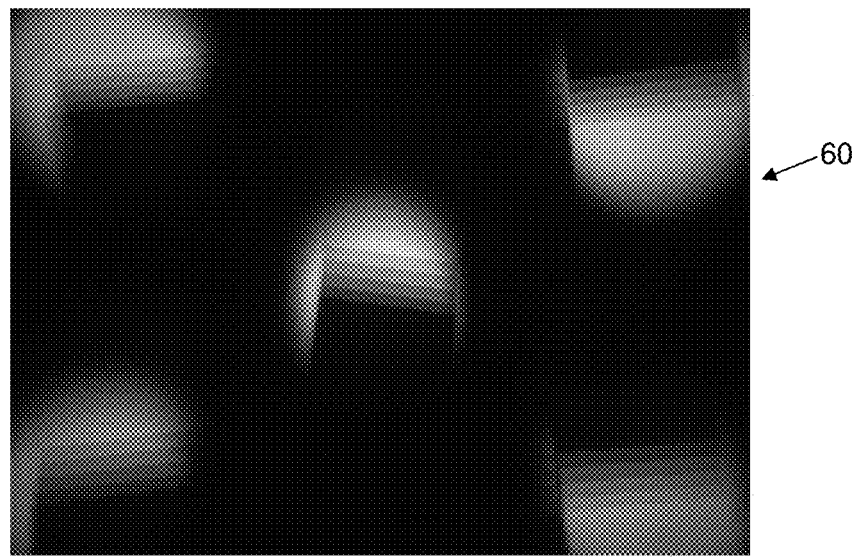
FIG. 7 shows an exemplary calibration image that is obtained from the superimposition of multiple pictures in accordance with the invention.

FIG. 7 shows an exemplary calibration image 60 that is obtained from the superimposition of multiple pictures in accordance with the invention. In the resulting image, it can be observed that there are five sets of patterns, the five sets of patterns being located at the center and the four corners of the image respectively. Accordingly, the collimators 24 are distributed such that each collimator 24', 24" is operative to direct a separate chart pattern 30 onto a different area of the calibration image 60 captured by the image sensor. More specifically, the central collimator 24' directs a chart pattern 30 to the centre of the calibration image 60 whereas the inclined collimators 24" direct chart patterns 30 to four corners of the calibration image 60.

For each of the areas associated with a respective collimator, there is a pattern comprising outputs from each of the five collimators with observable Y offsets. The Y offsets are caused by relative movement of the LED light source 28 in between the five flashes that are generated from the collimators 24 during operation of the Y motor. In respect of the lighting effects achieved from the five collimators 24 during operation of the Z motor, the points of focus for each of the five collimator patterns are checked and compared.

Figure 8:
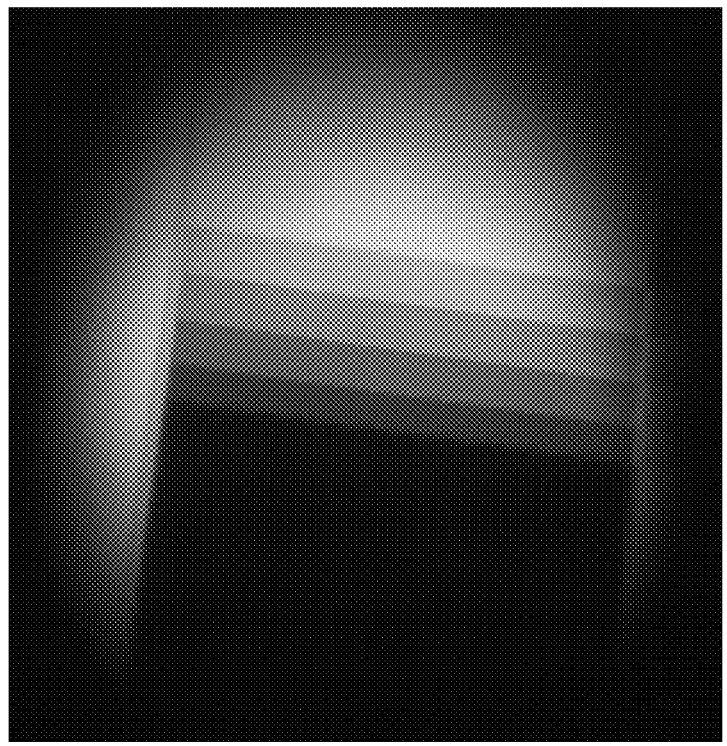
FIG. 8 is an enlarged view of the central image in FIG. 7 to show the effect of focusing.

FIG. 8 is an enlarged view of the central image in FIG. 7 to show the effect of focusing. In the resultant central image, the moving direction of the Y motor will cause the picture of the chart pattern 30 to shift with respect to a picture of another chart pattern successively from the bottom to the top of the central image. This means that the first line at the bottom is captured when the central collimator 24' is flashing at the Z=0 motor count, and the second line next to it is captured when the central collimator 24' is flashing at the Z=250 motor count.

From the resultant central image, it is observed that the second line is sharper than the first line. The third line is sharper than the second line, but the third line has similar sharpness to the fourth line. Comparatively, the fifth or top line is not as sharp as the third and fourth lines. From the foregoing, it can be deduced by comparing the respective points of focus of the chart patterns 30 captured at different distances that the best Z-level focusing position for the central region of the calibration image 60 of the image sensor 40 relative to the lens module 18 is approximately between 500 motor counts (third line) and 750 motor counts (fourth line).

When estimating the Z focusing level in the embodiment described above, the edge transition width has been used to obtain information on sharpness of the resulting picture. However, it should be appreciated that the information can be obtained not only by using the edge transition width, but also other approaches such as Modulation Transfer Function ("MTF"), Spatial Frequency Response ("SFR"), edge energy, etc. Nevertheless, when the edge quality is bad, such as when the edge transition width is large, it may not be possible to find an accurate edge transition value. Therefore, it should be appreciated that sometimes, all edge transition information may not be available. From the resultant image, there may be 3-5 edge transition widths generated to obtain sufficient information for estimating the Z-level focusing heights for the different regions in the calibration image 60.

Below are two exemplary equations that may be used for the estimation of the Z focusing level:

When the number of edge transition widths is equal to 3:

$$ax^2 + bx + c = y \quad (1)$$

When the number of edge transition widths is more than 3:

$$ax^3 + bx^2 + cx + d = y \quad (2)$$

(where x is the Z motor count at the trigger point, and y is the edge transition width (sharpness))

By setting the derivatives of the above equations (1) and (2) to zero, we can solve the equations to obtain the value of x. The physical manifestation for the solution of x is the Z motor count value, and where the edge transition width is better, it means that the edge transition width has the lowest value. Below is an example showing the how the value of x is solvable:

Setting the derivative of equation (1) to zero:

$$2ax + b = 0 \quad (3)$$

$$x = \frac{-b}{2a} \quad (4)$$

Setting the derivative of equation (2) to zero:

$$3ax^2 + 2bx + c = 0 \quad (5)$$

$$x_1 = \frac{-b - \sqrt{b^2 - 3ac}}{3a} \quad (6)$$

$$x_2 = \frac{-b + \sqrt{b^2 - 3ac}}{3a} \quad (7)$$

It is noted that there are two possible solutions for the fourth-order equation (2), at equations (6) and (7). The solution of equation (2) should be a local minimum, because these sampling points should change from out-focusing to focusing, and then out-focusing again, which means that the sharpness of edge transition width will change from a large value to a low value (best position) and then to a large value which is the local minimum point for the fourth-order equation.

The following equation shows how the local minimum result of equation (2) can be found:

Setting the second derivative of equation (2) to zero: If n=1, 2

$$6ax_n + 2b > 0 \quad (8)$$

Figure 9:
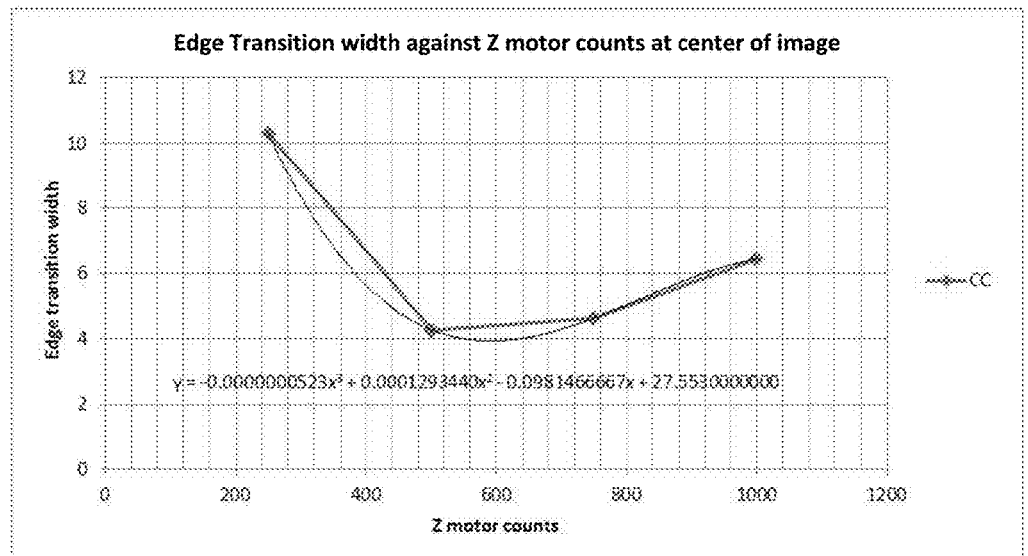
FIG. 9 is a graph illustrating edge transition widths against Z motor counts representing height that are obtained at the central image.

FIG. 9 is a graph illustrating edge transition widths against Z motor counts (representing height) that are obtained at the central image. During edge transition width detection, there are only four edge transition widths to be detected where the Z motor counts are Z=250, 500, 750 and 1000 respectively. As there is data on more than 3 valid edge transition widths, the fourth-order equation (2) may be used to solve it.

In the graph of FIG. 9, there is a curve illustrated by the solid line which is equivalent to the fourth order equation which best fits the four valid edge transition width data. The relevant fourth-order equation is set out below:

$$-5.23 \times 10^{-8} x^3 + 1.29 \times 10^{-4} x^2 - 9.81 \times 10^{-2} x + 27.55 = y \quad (9)$$

In the diagram, it can be observed that the best edge transition width location should between Z motor counts Z=500 and 750 respectively. After solving the above equation using equations (6), (7) and (8), it is found that the edge transition is the best when the Z motor count is at 592, which is relatable to a specific height of the image sensor relative to the lens module 18.

Figure 10:
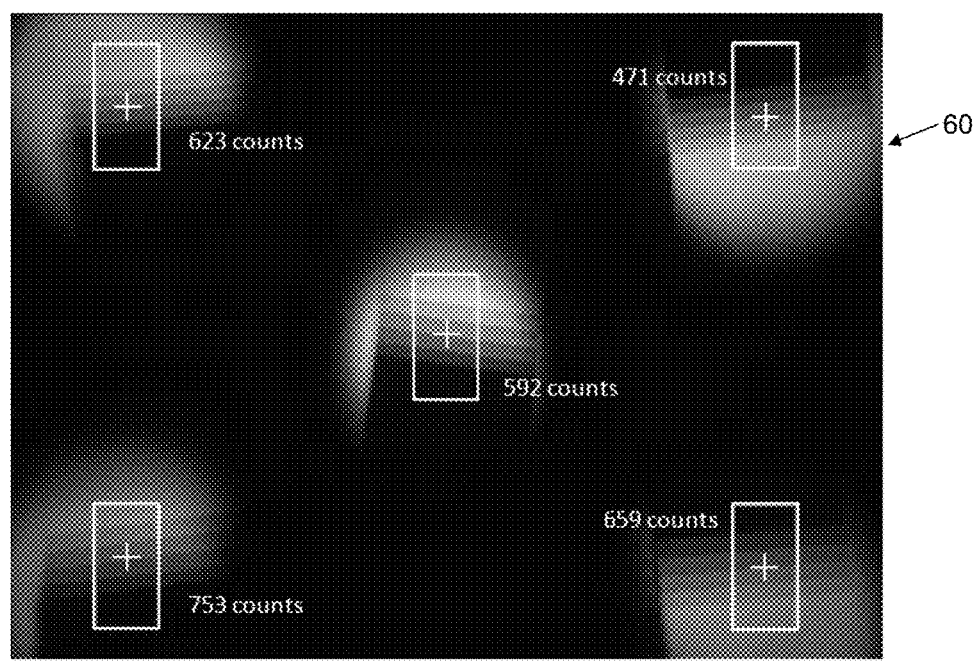
FIG. 10 is an image obtained from FIG. 9 illustrating the Z motor count results where the edge transition widths are the best at the central and corner regions for attaining accurate alignment of the lens module with respect to the image sensor.

FIG. 10 is an image obtained from FIG. 9 illustrating the Z motor count results where the edge transition widths are the best at the central and corner regions for attaining accurate alignment of the lens module with respect to the image sensor.

After calculating all the Z motor counts where the edge transition is the best at each of the regions in the single resultant image of FIG. 7, the tilt information relating to the lens module can be found by applying the two steps below:

Step 1: Finding the Extent of Tilt Between the Upper and Lower Edges

Average of the Z motor counts at the upper left and upper right corners =(623+471)/2=547 motor counts Average of the Z motor counts at the lower left and lower right corners =(753+659)/2=704 motor counts The difference between the Z motor counts between the above upper and lower average values (i.e. 547−704=157) will indicate the extent of tilt used for the lens module or image sensor correction. From the result, it is found that the lower edge has a higher Z motor count for the best focusing result compared with the upper edge.

Step 2: Finding the Extent of Tilt Between the Left and Right Edges

Average of the Z motor counts at the upper left and lower left corners =(623+753)/2=688 motor counts Average of the Z motor counts at the upper right and lower right corners =(471+659)/2=565 motor counts The difference between the Z motor counts between the left and right average values (i.e. 688−565=123) will indicate the extent of tilt used for the lens module or image sensor correction. From the result, it is found that the left edge has a higher Z motor count for the best focusing result compared with the right edge.

Using the respective results, tilting of the lens module or image sensor may be corrected accordingly. After tilting correction, improved pictures with the best sharpness are achievable at all the four corners.

Moreover, at least three resultant points which include the X, Y and Z coordinates can be used to find the extent of tilt of a plane by solving the planar equation below:

$$ax+by+cz=d \quad (10)$$

After the alignment between the lens module 18 and the image sensor 40 is determined using a processor for analyzing the calibration image 60, they are aligned accordingly using the grippers 14 to adjust the lens module 18 before the image sensor 40 is attached to the lens module 18.

It should be appreciated that the alignment system according to the preferred embodiment of the invention is able to achieve faster lens module bonding by superimposing multiple pictures. The said superimposition of multiple pictures allows more information to be contained in a single calibration image 60 to thereby reduce the number of separate calibration images that need to captured and transferred.

In order to further increase the alignment speed, the aforesaid on-the-fly picture capturing system avoids the need to wait for settling time required by the motor, which would have been necessary if the motors have to be stopped multiple times for capturing the pictures of the calibration pattern. This is done by the simultaneous synchronization of the illumination lighting and the motor, which triggers the illumination lighting once certain motor counts are reached.

The invention described herein is susceptible to variations, modifications and/or additions other than those specifically described and it is to be understood that the invention includes all such variations, modifications and/or additions which fall within the spirit and scope of the above description.

The invention claimed is:

1. A method for aligning an image sensor relative to a lens module prior to fixing the image sensor to the lens module, the method comprising the steps of:
   turning on an exposure of the image sensor and moving the image sensor to different distances relative to the lens module;
   at certain predetermined distances between the image sensor and the lens module, illuminating a calibration pattern and capturing with the image sensor two or more pictures of the calibration pattern which is focused through the lens module to produce at least two pictures of the calibration pattern captured at different distances, the at least two pictures being superimposed onto a calibration image;
   turning off the exposure of the image sensor; and
   analyzing the pictures of the calibration pattern that are superimposed onto the calibration image for determining an alignment between the lens module and the image sensor.

2. The method as claimed in claim 1, further comprising the step of holding the lens module with a gripper assembly and adjusting the lens module with the gripper assembly to achieve the alignment that has been determined prior to fixing the image sensor to the lens module.

3. The method as claimed in claim 1, wherein the calibration pattern is contained in a collimator module which is operative to direct the chart pattern to the image sensor through the lens module.

4. The method as claimed in claim 3, wherein the collimator module further comprises a plurality of collimators that are distributed such that each collimator is operative to direct a separate calibration pattern onto a different area of the calibration image.

5. The method as claimed in claim 4, wherein the different areas of the calibration image comprise regions corresponding to at least four corners of the calibration image.

6. The method as claimed in claim 4, wherein the collimators are positioned equidistant to one another.

7. The method as claimed in claim 4, wherein the collimators comprise a central collimator positioned vertically and a plurality of inclined collimators that surround the central collimator, and each inclined collimator is tilted at an oblique angle with respect to the central collimator.

8. The method as claimed in claim 4, wherein each collimator comprises a calibration pattern, a light source for illuminating the calibration pattern and a lens assembly for directing the illuminated calibration pattern towards the image sensor.

9. The method as claimed in claim 8, wherein the calibration pattern contains a chart including a slanted edge pattern appearing on it.

10. The method as claimed in claim 1, wherein the step of moving the image sensor to different distances relative to the lens module further comprises the step of moving a positioning table on which the image sensor is supported for positioning the image sensor.

11. The method as claimed in claim 1, wherein the step of moving the image sensor further comprises the step of simultaneously moving the image sensor to varying vertical positions as well as varying horizontal positions relative to the lens module.

12. The method as claimed in claim 11, wherein the step of illuminating the calibration pattern is conducted at predetermined vertical positions of the image sensor relative to the lens module.

13. The method as claimed in claim 12, wherein the different vertical positions of the image sensor are actuated by a stepper motor such that a motor count of the stepper motor represents a current height of the image sensor.

14. The method as claimed in claim 1, wherein the step of determining the said alignment further comprises the step of comparing respective points of focus of the calibration patterns captured at different distances for the best focusing distance of the image sensor relative to the lens module.

15. The method as claimed in claim 14, wherein the best focusing distance is determined from the distance at which an edge transition width of a superimposed calibration pattern is the best.

16. The method as claimed in claim 1, wherein each picture of the calibration pattern that is superimposed onto the calibration image captured by the image sensor is shifted with respect to another picture of the calibration pattern on the calibration image.

* * * * *